United States Patent [19]
Dömer et al.

[11] Patent Number: 4,583,235
[45] Date of Patent: Apr. 15, 1986

[54] SELF-ADJUSTING EQUALIZER CONFIGURATION WHICH AUTOMATICALLY ADJUSTS TO THE CABLE LENGTH

[75] Inventors: Josef Dömer, Hohenschäftlarn; Hans G. Härle, Leitershofen, both of Fed. Rep. of Germany

[73] Assignee: Siemens Aktiengesellschaft, Berlin and Munich, Fed. Rep. of Germany

[21] Appl. No.: 546,124

[22] Filed: Oct. 27, 1983

[30] Foreign Application Priority Data

Nov. 11, 1982 [DE] Fed. Rep. of Germany ....... 3241813

[51] Int. Cl.$^4$ .............................................. H03H 7/40
[52] U.S. Cl. ........................................ 375/11; 333/18; 333/28 R
[58] Field of Search ................ 375/11, 12, 14; 333/18, 333/28 R; 364/724, 825; 307/359

[56] References Cited

U.S. PATENT DOCUMENTS

| | | |
|---|---|---|
| 3,578,914 | 5/1971 | Simonelli ............................ 179/16 F |
| 3,763,359 | 10/1973 | Cho et al. ............................. 375/14 |
| 4,003,006 | 1/1977 | Mandeville et al. .................. 375/12 |
| 4,243,956 | 1/1981 | Lemoussu et al. ................... 333/18 |
| 4,251,782 | 2/1981 | Bynum ................................ 375/12 |
| 4,298,983 | 11/1981 | Kawai et al. ......................... 375/14 |
| 4,430,744 | 2/1984 | Johnson ............................... 375/14 |

FOREIGN PATENT DOCUMENTS 2068196  8/1981  United Kingdom .

OTHER PUBLICATIONS

"Datenuebertragung", P. Bocker, pp. 98 to 114.

Primary Examiner—Robert L. Griffin
Assistant Examiner—Stephen Chin
Attorney, Agent, or Firm—Thomas H. Jackson

[57] ABSTRACT

The invention involves a self-adjusting equalizer configuration which automatically adjusts to the cable length. The equalizer configuration has band limitation for the transmission of digital signals and consists of an equalizing amplifier, a correction filter, and an amplitude control loop with a comparison of actual and nominal values. The object of the invention is to specify a circuit in which the correction filter is not located in the signal path. This object is achieved in such a way that the equalizing amplifier is located in the signal path, and the correction filter is placed in the amplitude control loop so that the output signal of this correction filter represents the actual value for the amplitude control loop.

2 Claims, 17 Drawing Figures

FIG 4
FIG 4a
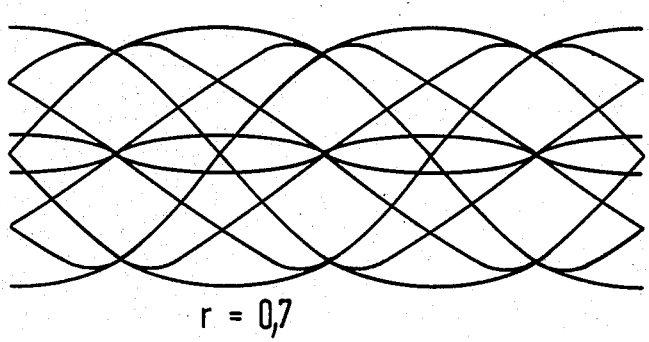
r = 0,7
FIG 4b
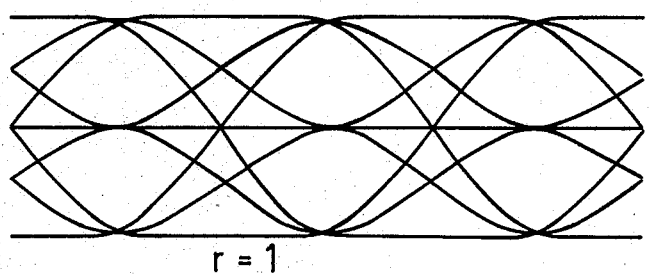
r = 1
FIG 5
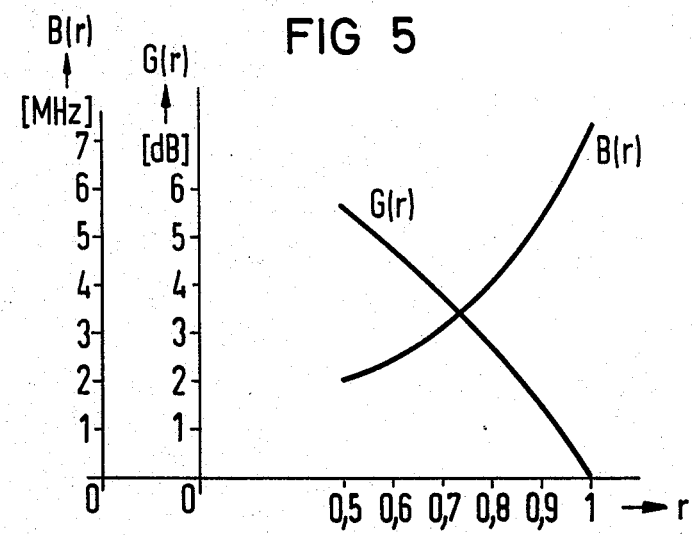

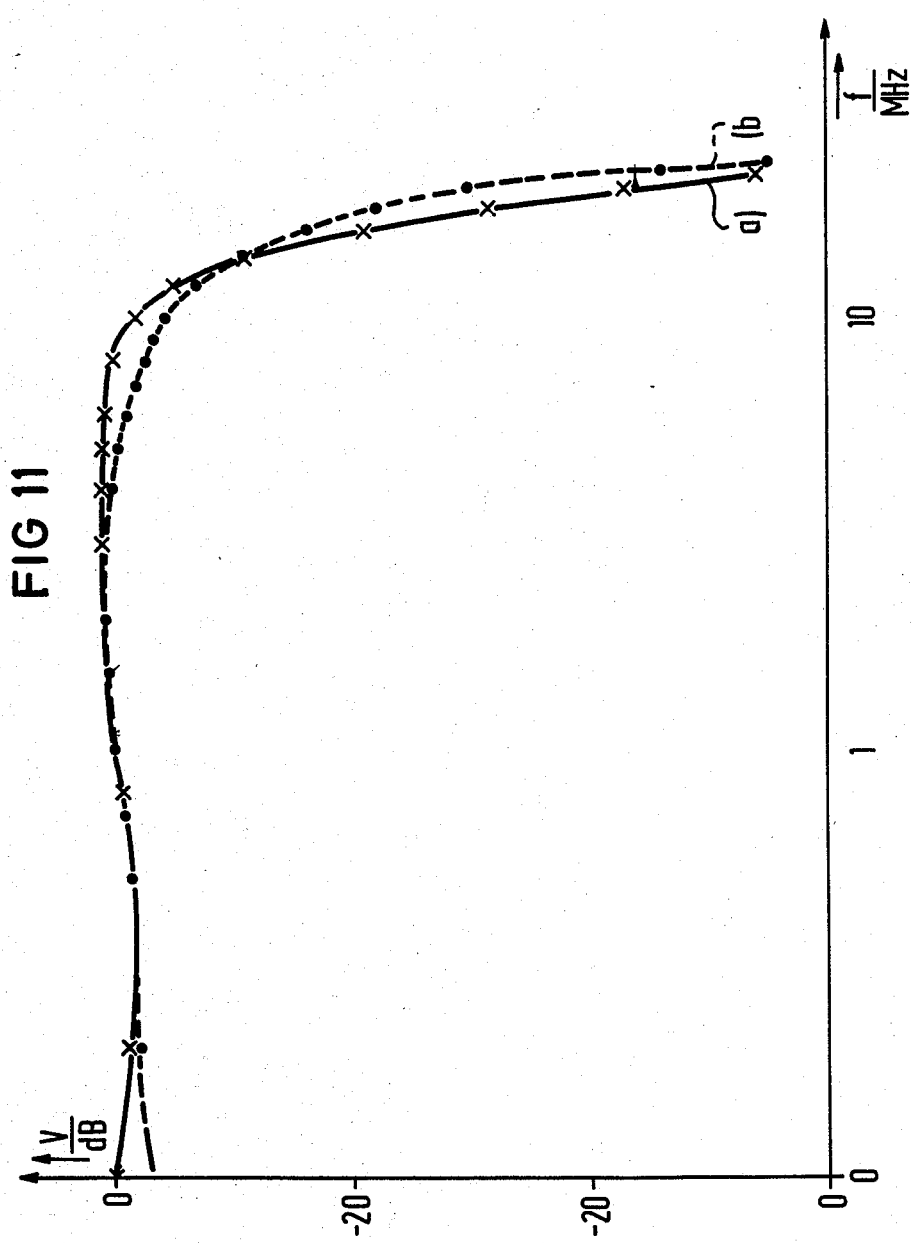

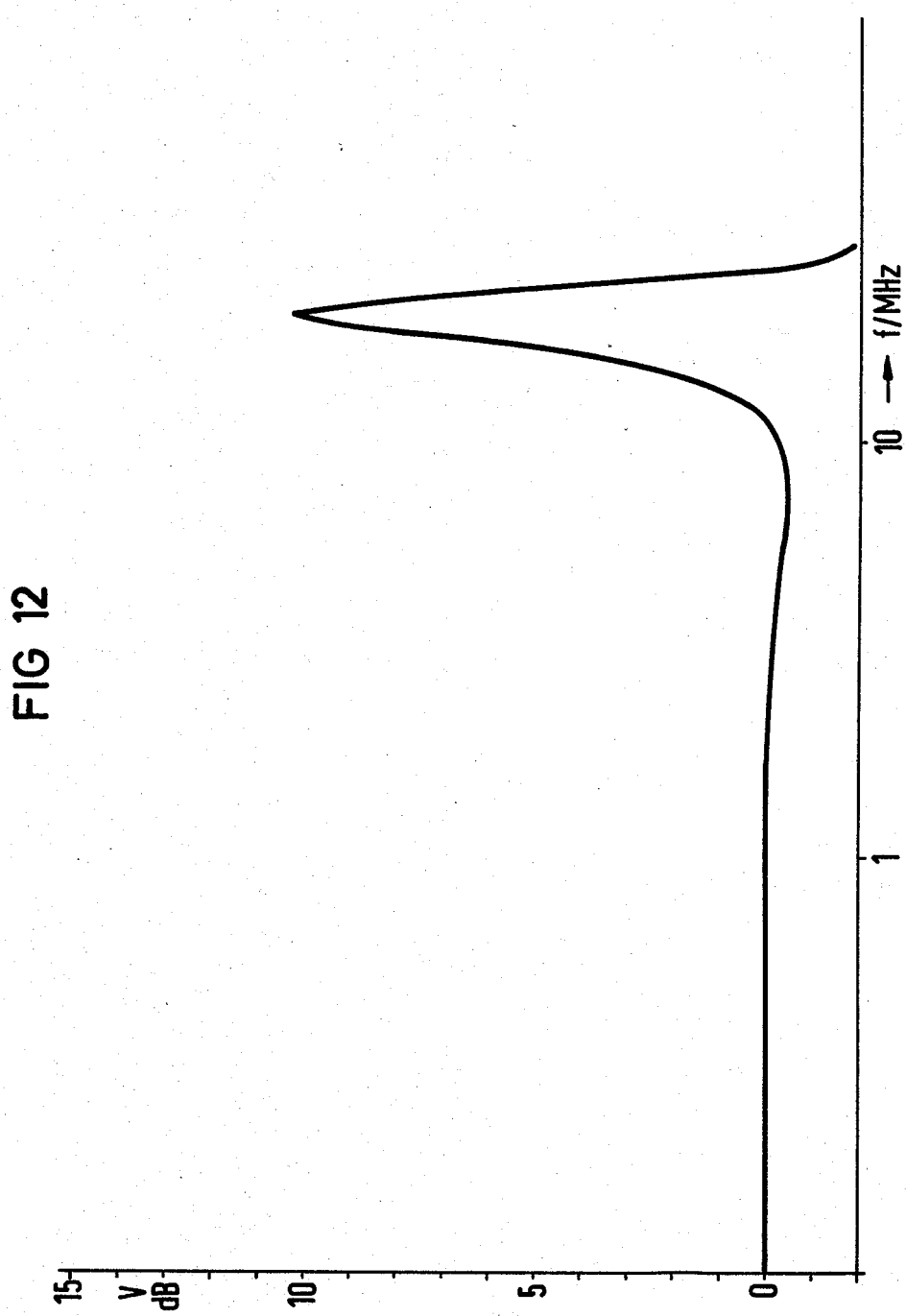

$\dfrac{U_2}{U_1} \mathrel{\hat=}$ Fig. 13a $\dfrac{U_2}{U_1} \mathrel{\hat=}$ Fig. 13b

SELF-ADJUSTING EQUALIZER CONFIGURATION WHICH AUTOMATICALLY ADJUSTS TO THE CABLE LENGTH

BACKGROUND OF THE INVENTION

The invention relates to a self-adjusting equalizer configuration which automatically adjusts to the cable length. The equalizer configuration includes a band limitation for the transmission of digital signals and consists of an equalizing amplifier, a correction filter, and an amplitude control loop which includes a comparison of actual and nominal values.

Digital signal regenerators in transmission systems with coaxial cables as the transmission medium have an automatic attenuation equalizer at the input in order to equalize the distortions resulting from the frequency-dependent cable loss. The amplitude of the equalized signal; e.g., the amplitude of the signal at the discriminator, is used as a control criteria for adjusting the equalizer to the length of the cable. This pulse amplitude must be as independent as possible from the input pattern. However, this is the case only when a specific band limitation is adhered to in the equalizer. To suppress random noise and interference signals, however, a tighter band limitation must be used which results in varying pulse amplitudes in the signal path as a function of the input pattern.

The band limitation required to reduce noise is usually implemented as a "roll-off" band limitation as described, for example, in the book by P. Bocker: "Datenuebertragung" (Data Transmission), Vol. 1, pages 98–114 (Springer Verlag 1978).

Transmission systems for higher bit rates, such as 34 Mbit/s, are only possible with a roll-off factor that is less than 1 for the field lengths and transmitting power applicable in this case, so that $r<1$. This fact results in signal overshoots, the amplitude of which is dependent on the pulse sequence. This concept will be explained later with reference to FIG. 1. Another known configuration that circumvents the disadvantage of the dependence of the equalizer setting on the pulse sequence will be explained with reference to FIG. 2. The difficulties that are particularly evident for this configuration are explained as follows: The maximum gain of the equalizing amplifier for a roll-off factor with the value 1 is greater and takes place at a higher frequency than that of an amplifier for a roll-off factor with a value $<1$. This is illustrated in FIG. 7 and requires more effort, particularly at higher bit rates such as 140 Mbit/s. In addition, two phase-equalized filters are located in the signal path, the tolerances and aging of which directly influence the accuracy, and therefore the quality, of the regenerator.

SUMMARY OF THE INVENTION

The object of the invention is to provide an automatic equalizer configuration in which the correction filter is not located in the signal path, but in the amplitude control circuit, so that fewer demands must be made on the accuracy of the correction. Moreover, the equalizing amplifier only requires a band limitation with a roll-off factor $<1$. This also ensures that the correction filter attenuates instabilities of the entire control circuit for frequencies above the transmission band due to its low pass response.

In general, the invention features a self-adjusting equalizer configuration which automatically adjusts to the cable length, with band limitation for transmitting digital signals, and which includes an equalizing amplifier, a correction filter and an amplitude control loop with comparison of actual and nominal values, in which the equalizer amplifier is located in the signal path, and the correction filter is located in the amplitude control loop so that the output signal of the correction filter represents the actual value for the amplitude control loop.

In preferred embodiments the eqalizer configuration includes a signal pulse derived after the correction filter, to control a discriminator connected in series with the equalizer amplifier; the circuit configuration and the size of the correction filter are selected so that it has the following transfer function $$\mathcal{H}\left(f\right) = V_o \cdot \frac{1}{1+j\frac{f}{f_1}} \cdot \frac{1-\left(\frac{f}{f_R}\right)^2 + ja\frac{f}{f_R}}{1-\left(\frac{f}{f_R}\right)^2 + jb\frac{f}{f_R}}$$

where, $V_o$ is basic amplification, $f_1$ is the cut-off frequency of a low pass filter, and $f_R$ is a resident frequency of a tuned circuit, with a and b as its constants.

Other features and advantages of the present invention will become apparent from the following detailed description, and from the claims.

For a full understanding of the present invention, reference should now be made to the following detailed description and to the accompanying drawings.

BRIEF DESCRIPTION OF THE DRAWINGS

FIG. 4 shows an eye diagram of the signal after the discriminator and after the roll-off converter. FIG. 4a shows these relationships for a roll-off factor $r=0.7$ and FIG. 4b shows these relationships for a roll-off factor $r=1$.

FIG. 5 shows the theoretical effective noise band with B (r) and the band width gain $G(r)=10 \text{ Log } B(r=1)/B(r)$, referenced to $r=1$ and as a function of the roll-off factor r of an equalizing amplifier for a line with $$a/\text{dB} = 60\sqrt{1/12.88} \text{ MHz.}$$

FIG. 11 shows the measured transfer coefficient V/dB of the entire transmission path. Curve a shows the transfer coefficient V of line and attenuation equalizer and curve b shows the transfer coefficient of line, attenuation equalizer and roll-off converter.

FIG. 12 shows the measured gain V/dB of the roll-off converter for a roll-off factor of $r \approx 0.7$, which is converted to a roll-off factor of $r \approx 1$.

FIG. 13a shows a transistor as an active element; FIG. 13b also shows a transistor as an active element, where FIG. 13b illustrates the dual circuit for FIG. 13a. FIG. 13c illustrates an operational amplifier as an active element in which V goes toward infinity; and FIG. 13d illustrates an additional circuit option with an operational amplifier. The transfer response $U_2/U_1$ is shown directly and the transfer coefficient of the circuit according to FIG. 13c is equal to that of FIG. 13a, while the transfer coefficient of the circuit according to FIG. 13d is equal to that of FIG. 13b.

DETAILED DESCRIPTION

It should be noted that elements having the same function are assigned the same reference numbers in the individual figures so that explanations given for these elements will be valid for all figures.

Figure 1:
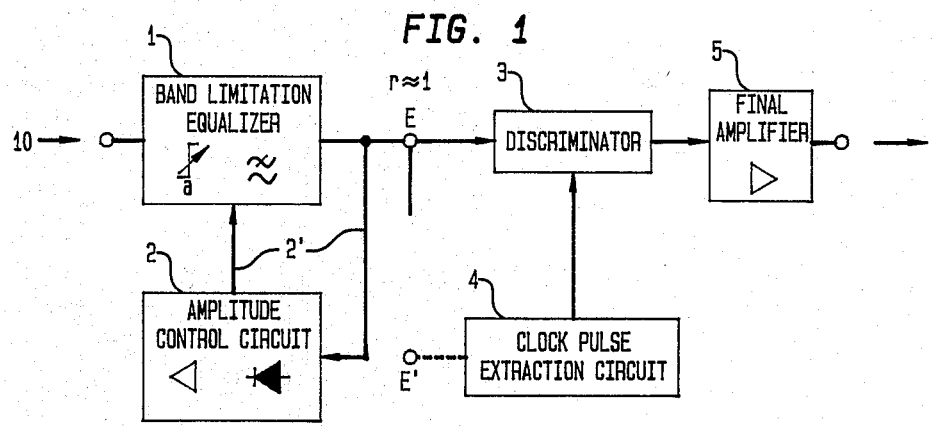
FIG. 1 is a block diagram of an existing regenerator described in the book by Bocker entitled "Datenuebertragung" (Data Transmission) which has already discussed.

Referring to FIG. 1, data signal 10 reaches equalizer 1 which has band limitation. Output signal E or output signal E' appears at the output of this equalizer. Output signal E is applied to discriminator 3 which is followed by final amplifier 5. In amplitude control loop 2', the output signal E is also applied to amplitude control loop 2 from which, in turn, band-limited equalizer 1 is triggered. An additional signal E' triggers timing recovery generator 4 which controls discriminator 3.

Figure 2:
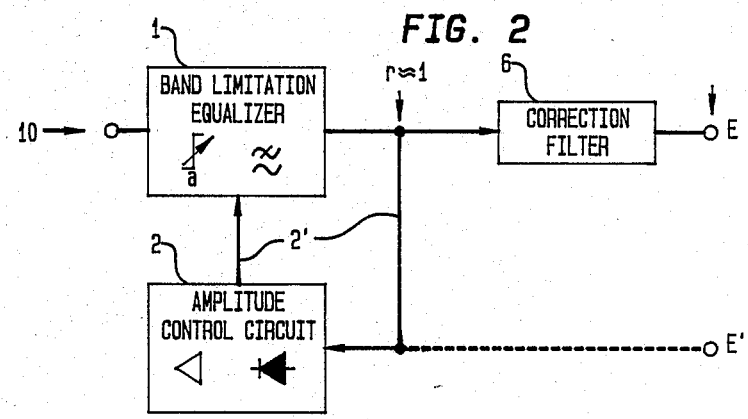
FIG. 2 is a block diagram of the previously discussed equalizer, which has a band limitation for a roll-off factor of $r \approx 1$ and a correction filter for $r=1$ or $r=0.7$ in the signal path.

A similar configuration can also be seen in FIG. 2, where the input signal is again identified by 10 and the output signal by E. Amplitude control loop 2' can also be recognized along with signal E', which is connected to amplitude control loop 2'. In contrast with FIG. 1, correction filter 6 is now provided in the signal path in the circuit diagram of FIG. 2. Details concerning the effect of this correction filter will be given later.

Figure 3:
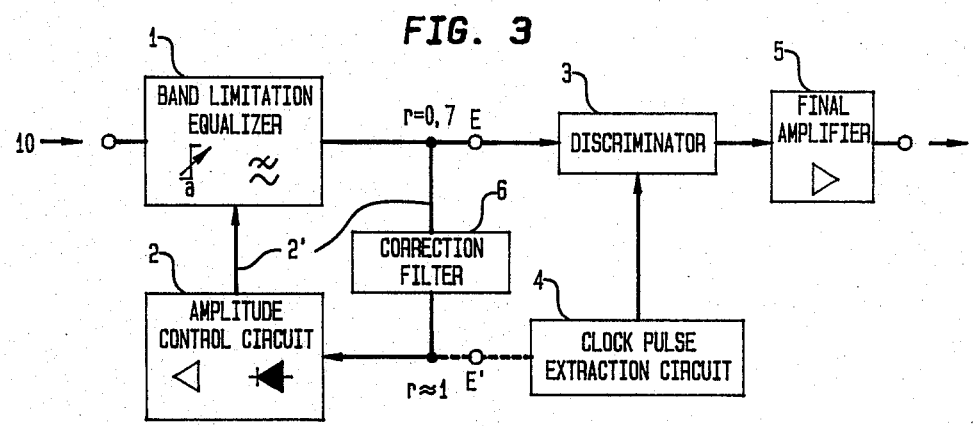
FIG. 3 is a block diagram of the equalizer configuration of the invention with a correction filter for $r=0.7$ or $r=1$ in the amplitude control loop.

In the embodiment shown in FIG. 3, correction filter 6 is located in amplitude control loop 2'-2. Therefore, output signal E is applied to ths correction filter and subsequently reaches amplitude control circuit 2. A roll-of factor of r=0.7 in the signal path 10/E is assumed and a roll-off factor $r \approx 1$ results at the output of correction filter 6 or at the input of amplitude control circuit 2. It is also possible there, as in FIG. 2, to provide an output signal E' after correction filter 6.

FIG. 13 illustrates the simple options which can be used to implement the transfer functions required here. For this purpose, a low pass function and a resonant amplifier with a series and parallel attenuation circuit must be used. In the circuits shown in FIG. 13, the transfer function $U_2/U_1$ is directly specified at the individual circuits. $U_2$ is the output voltage and $U_1$ is the input voltage of an amplifier. In FIG. 13a, a transistor T is used as the active element with input voltage $U_1$ applied to the base of the transistor. The following are located in the emitter circuit: the parallel circuit consisting of a resistor $R_p$, and a series-circuit consisting of capacitor C, coil L, and dissipation resistor $R_s$. Resistor $R_c$ and capacitor $C_c$ are located in the collector circuit. FIG. 13b illustrates a possible circuit which is the dual circuit for the circuit shown in FIG. 13a. For this reason, the series-circuit in the emitter circuit consists of resistor $R_c$ and coil $L_E$, while the series configuration consisting of a resistor $R_s$ and the series-connected parallel circuit consisting of a coil L, a resistor $R_p$, and a capacitor C are located in the collector circuit.

Figure 13A:
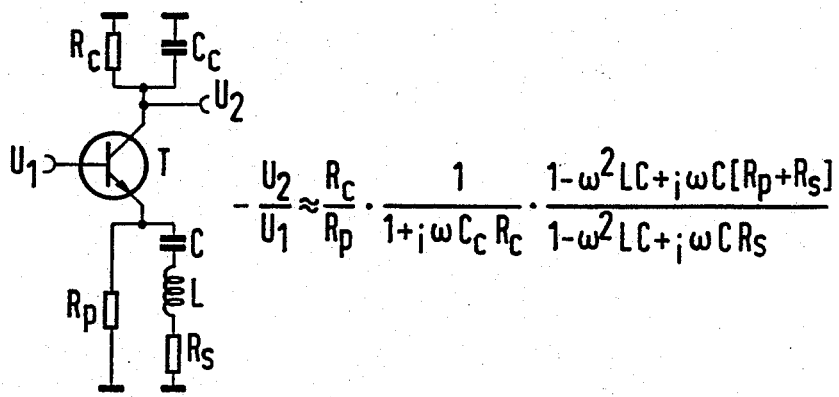
FIGS. 13A–13D show schematically possibilities for implementing a roll-off converter, and how it can be utilized for the automatic equalizer described here.
Figure 13B:
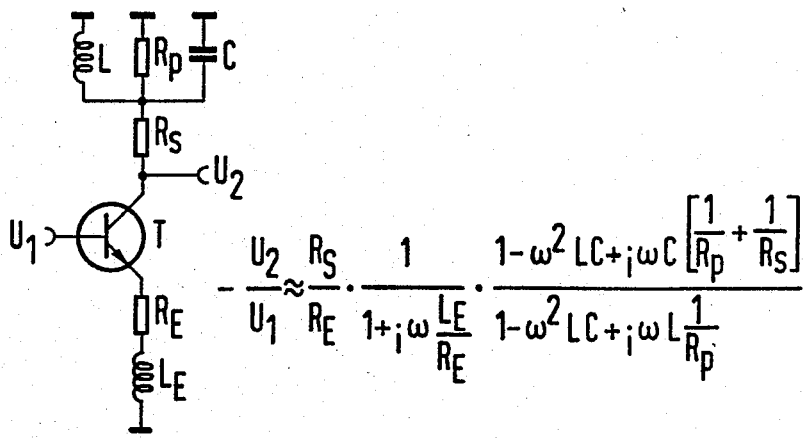
Figure 13C:
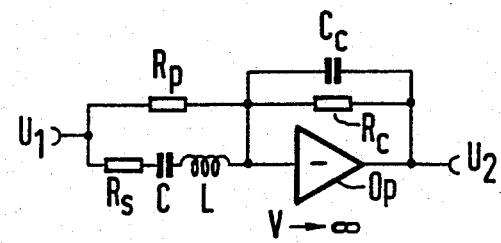
Figure 13D:
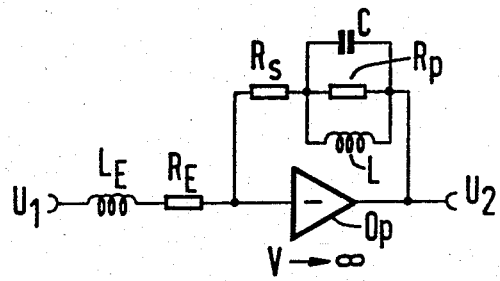

In FIGS. 13c and 13d, amplifiers are used which have the characteristics of operational amplifiers and are therefore provided with the reference symbol Op. Consideration should be given to the fact that the gain v goes toward infinity. In the circuit illustrated in FIG. 13c, the parallel circuit consisting of a resistor and a capacitor is located in the negative feedback circuit, for example between the amplifier output and the amplifier input. The parallel circuit consisting of a resistor and an attenuated series resonance circuit is located in the amplifier input.

In the circuit illustrated by FIG. 13d, the series circuit consisting of a resistor, to which the parallel circuit consisting of a capacitor, a resistor, and a coil is connected in series, is in a negative feedback circuit, while the series circuit consisting of a coil and a resistor is located in the amplifier input.

Reference is now made to the following configurations for further explanation and for a better theoretical understanding of the invention.

FIG. 1 shows the block diagram of a typical regenerator, consisting of line attenuation equalizer 1 with amplitude control circuit 2, discriminator 3 with timing recovery 4, and final amplifier 5.

The band limitation required for reducing noise (receiver noise, cross-talk interference) before the discriminator is usually implemented as a roll-off band limitation according to a previously discussed reference. Transmission systems for higher bit rates (such as 34 Mbit/s) for the field lengths and transmitting power specified therein can only be implemented with a roll-off factor of r<1.

However, a factor of r<1 results in signal overshoots, the amplitude of which is dependent on the pulse sequence. This means that the peak value rectifier in the amplitude control circuit of the equalizer supplies a different value for random sequences than for a fixed pulse sequence, and that it supplies different values for different sequences. Therefore, the automatic equalizer (provided the time constants in the control circuits are sufficiently long) will set itself to the correct value only in the case of random sequences or in the case of a particular fixed sequence.

FIG. 2 illustrates a configuration known in principle which avoids the disadvantage of setting the equalizer as a function of the pulse sequence. Equalizer 1 contains a band limitation with $r \approx 1$ and its output signal (E) is virtually free of overshoots. The timing recovery for reducing the ground jitter of the regenerator can also be derived from this signal E' as needed.

Figure 6:
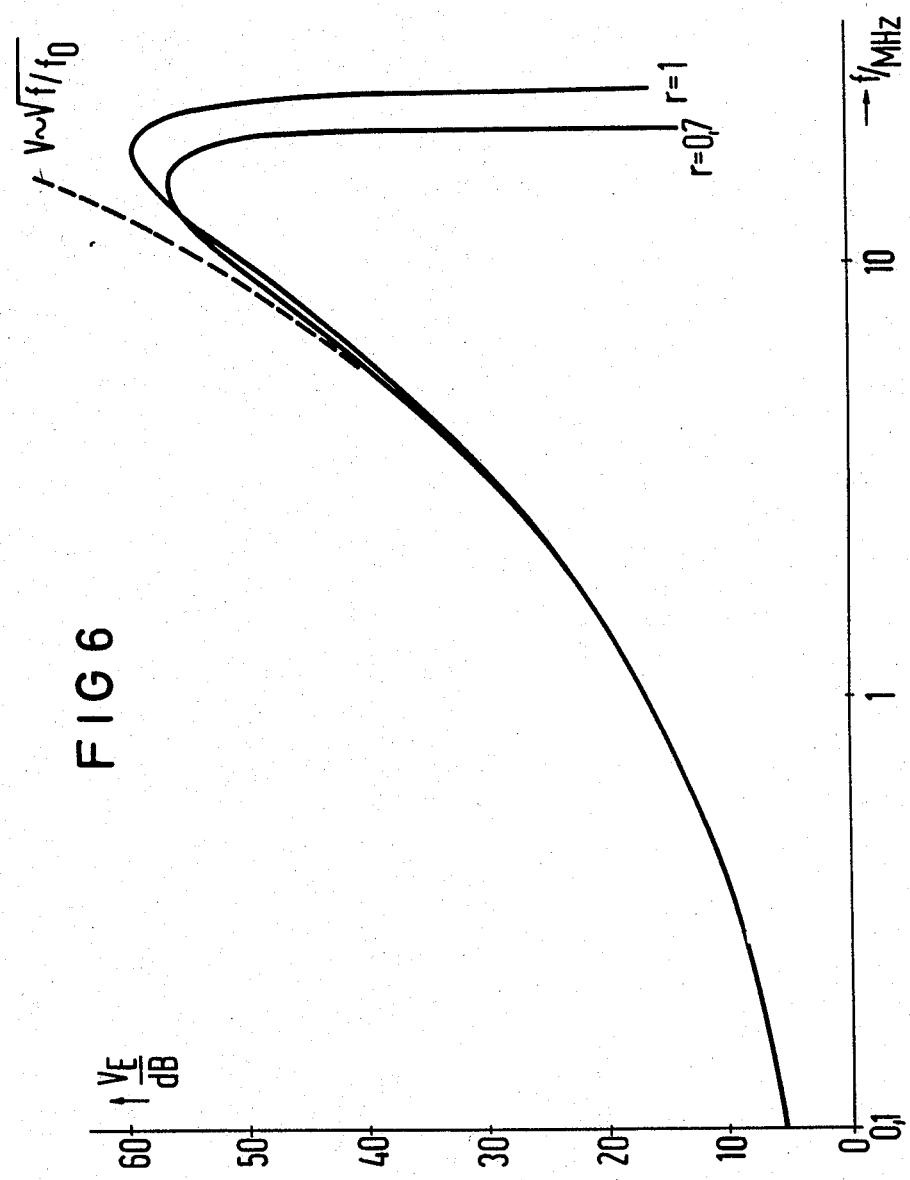
FIG. 6 shows the theoretical gain of the equalizer for $r=1$ and $r=0.7$.

In the signal path, equalizer 1 is followed by additional filter 6 with a linear phase for reducing the roll-off factor (FIG. 6 shows the theoretical value of the transfer function).

The disadvantages of the configurations shown in FIGS. 1 and 2 are as follows:
(a) The maximum amplification of the equalizing amplifier for r=1 is greater and takes place at a higher frequency than that of an amplifier for r<1 (FIG. 7) and requires more effort, particularly at high bit rates such as 140 Mbit/s.
(b) Two phase-equalized filters are located in the signal path, the tolerances and aging of which directly influence the accuracy of equalization (nodes in the diagram), and therefore the quality of the regenerator.

The configuration shown in FIG. 3 avoids these disadvantages, in accordance with the invention.

Correction filter 6 for roll-off conversion is not located in the signal path, but in amplitude control circuit 2, 2', thus requiring less demands to be made on the accuracy of the correction. Equalizing amplifier 1 is implemented only for a band limitation with 1<r.

A 34 Mbit/s theoretical transmission system with a cable loss $a_o=60$ dB at the Nyquist frequency $f_o=12.88$ MHz will be used as an example.

The theoretical transfer function of line attentuation equalizer 1 is $$F_E(f) = \frac{Se(f)}{Ss(f)} \cdot \frac{1}{F_{Ltg}(f)}$$

with the desired receive spectrun of a roll-off pulse with band limitation, $$S_e(f) = A_e \cdot \left[\frac{1}{2}\left(1 - \sin\frac{\pi}{2r}\left(\frac{f}{f_o} + 1\right)\right)\right] \text{ for } (1-r) < \frac{f}{f_o} < (1+r)$$

$$= A_e \quad \text{for } \frac{f}{f_o} < (1-r)$$

$$= 0 \quad \text{for } \frac{f}{f_o} > (1+r)$$

($A_e$ is the receive amplitude, r is the roll-off factor) the spectrum of a transmit pulse which approximates actual applications, ($A_s$ is the transmit amplitude; the 2nd factor is the spectrum of an ideal, half-bit-wide, square wave pulse; the 3rd factor takes into account cosine-shaped signal slopes), and the approximate transfer function of a line $$F_{Ltg}(f) = 10^{-\frac{a}{20}} \text{ with } a = a_o \cdot \sqrt{\frac{f}{f_o}}$$

Figure 7:
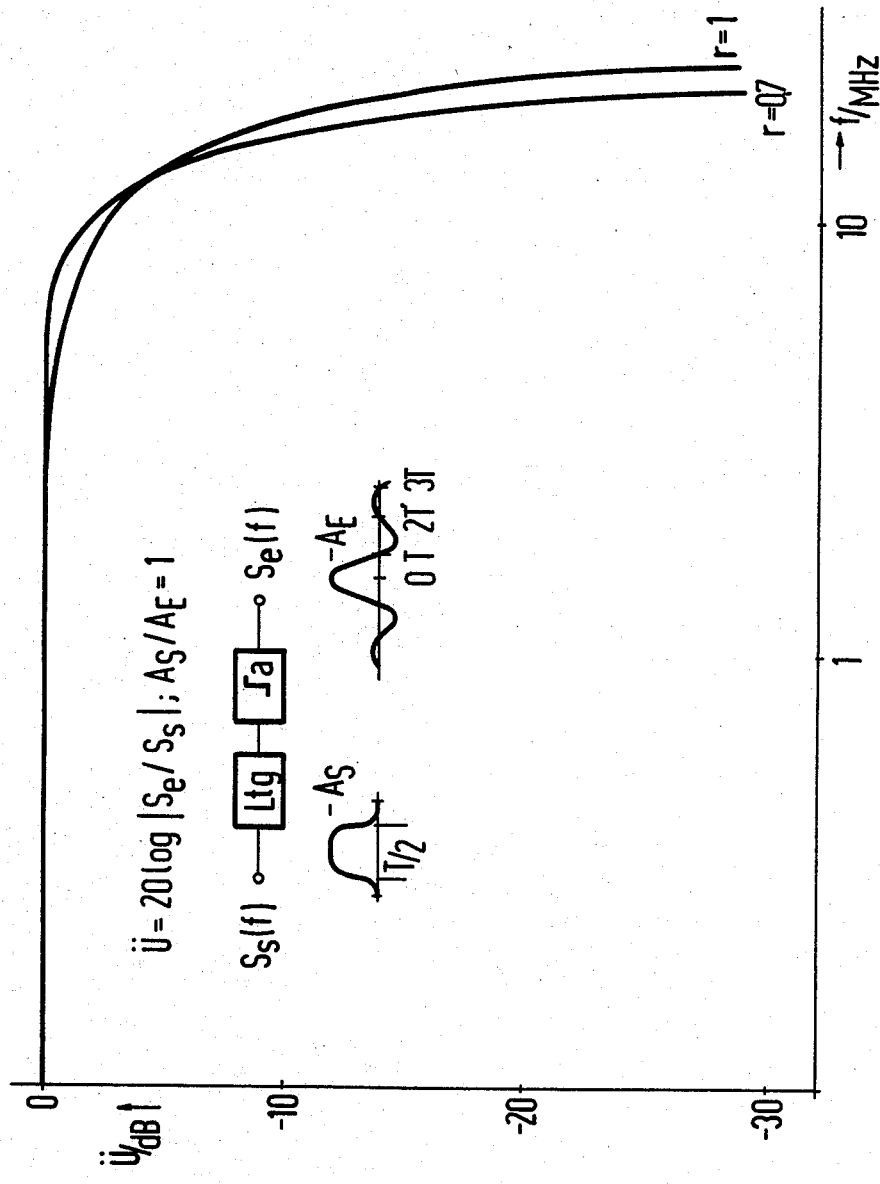
FIG. 7 shows the transfer coefficient Ue of line and equalizer for a roll-off factor $r=1$ and $r=0.7$ as a function of the frequency f.

FIG. 6 shows the gain $V=20\cdot\log F_E(f)$ of the equalizer for r=1 and r=0.7. FIG. 7 shows the transfer coefficient of the entire transmission path $ü=20\cdot\log(F_E \cdot F_{Ltg})$.

R=0.7 has been chosen for the example.

The theoretical transfer function $F_{K1}$ for the correction filter illustrated by FIG. 2 for reducing the roll-off factor is $$F_{K1} = \frac{Se(r,f)}{Se(r=1,f)} =$$

$$\frac{1 - \sin\frac{\pi}{2r}\cdot\left(\frac{f}{f_o} - 1\right)}{1 - \sin\frac{\pi}{2}\left(\frac{f}{f_o} - 1\right)} \text{ for } (1-r) < \frac{f}{f_o} < (1+r)$$

-continued $$\frac{2}{1 - \sin\frac{\pi}{2}\left(\frac{f}{f_o} - 1\right)} \text{ for } \frac{f}{f_o} < (1-r)$$

Figure 8:
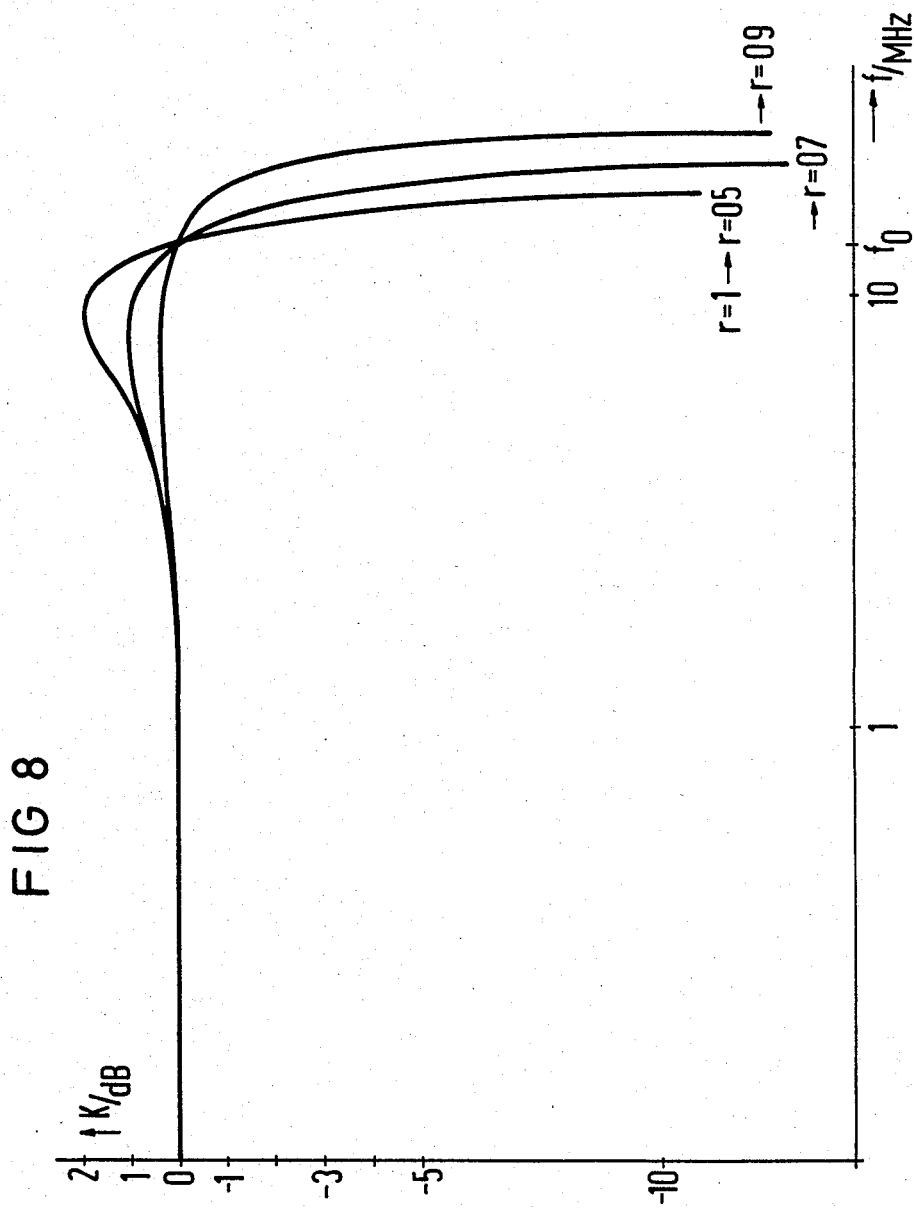
FIG. 8 shows a theoretical correction filter K/dB for reducing the roll-off factor as a function of the frequency; for different roll-off factors $r=0.5$, 0.7, and 0.9.
Figure 9:
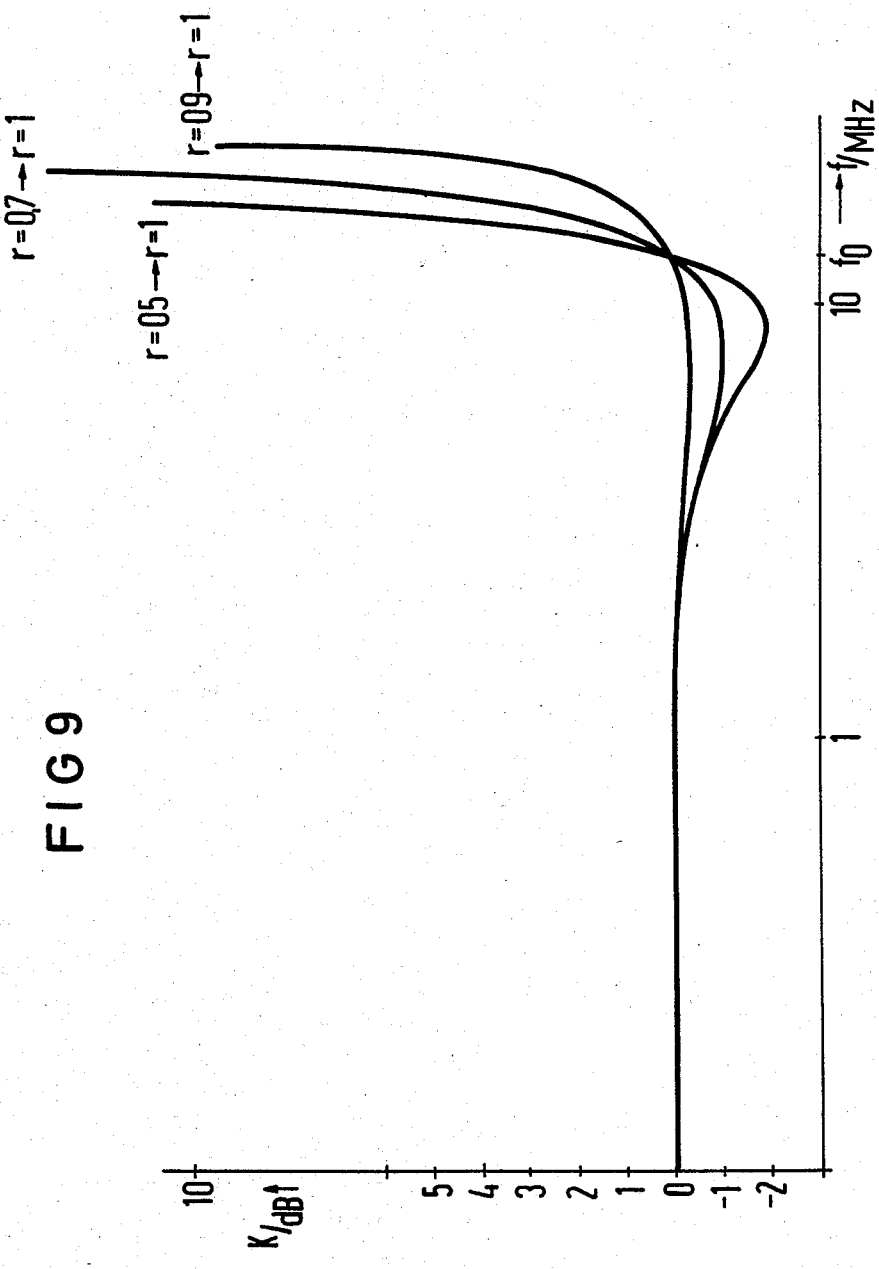
FIG. 9 shows a theoretical correction filter K/dB for reducing the roll-off factor as a function of the frequency f (the Nyquist frequency $f_o=12.88$ MHz).

FIG. 8 shows $20\cdot\log F_{K1}$ for different r values.

The theoretical transfer function for the correction filter illustrated by FIG. 3 for increasing the roll-off factor is $$F_K = \frac{1}{F_{K1}}$$

FIG. 5 shows $20\cdot\log F_K$ for different r values.

Now an actual transmission system according to FIG. 3 will be examined. This system has a cable loss of 60 dB at the Nyquist frequency $f_o=12.88$ MHz since the previously explained theoretical transfer functions $F_E(f)$, $F_{K1}$, and $F_K$ can, of course, only be approximated.

The line attenuation equalizers for this system are implemented as follows:

A workable compromise between the effort and accuracy of equalization is the transfer function $$\underline{V}(f) = V_o\left[\frac{1 - \left(\frac{f}{f_R}\right)^2 + ja\cdot\frac{f}{f_R}}{1 - \left(\frac{f}{f_R}\right)^2 + jb\cdot\frac{f}{f_R}}\right]^2 \cdot \frac{1 + j\frac{f}{f_1}}{1 + j\frac{f}{f_2}} \cdot \frac{1 - j\frac{f}{f_a}}{1 + j\frac{f}{f_a}}$$

This function is implemented in the embodiment by two tuned amplification stages with a serial and parallel attenuated resonant circuit (resonant frequency $f_R$, circuit constants a and b), a passive high pass filter (cut-off frequencies $f_1$ and $f_2$), and a passive all-pass filter (characteristic frequency $f_a$) for the linearization of the phase of the transmission path.

Figure 10:
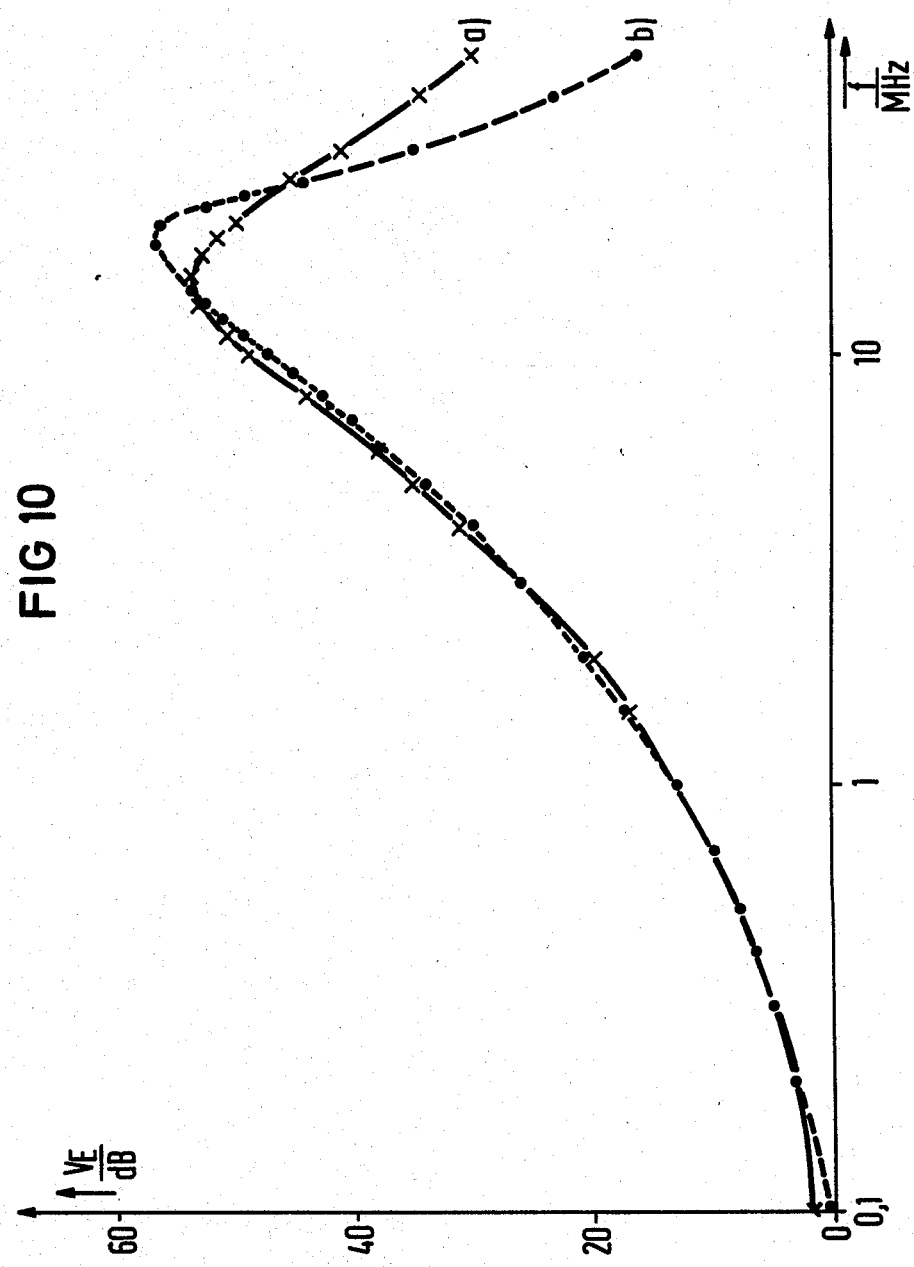
FIG. 10 shows the measured gain $V_E$/dB as a function of the frequency; curve a shows the gain of the attenuation equalizer and curve b shows the gain of the attenuation equalizer, including the roll-off converter.

In FIG. 10, curve a shows the measured gain of the line attenuation equalizer. In FIG. 11, curve a shows the measured gain of the series connection consisting of line plus attenuation equalizer.

The roll-off factor is $r\approx0.7$.

FIG. 4a shows the associated diagram for a "pseudo" random pulse sequence with its pattern-dependent overshoots.

This output signal is barely suitable as a control criterion for regulating a variable attenuation equalizer.

An equalizer for converting the roll-off from rf 0.7 to $r\approx1$ is implemented as follows.

The theoretical transfer coefficient shown in FIG. 10 need only be approximated up to a gain of approximately 10 dB; as shown by the measurements. The following transfer function is sufficient for this purpose:

$$\underline{V}(f) = V_o \cdot \frac{1}{1 + j\frac{f}{f_1}} \cdot \frac{1 - \left(\frac{f}{f_R}\right)^2 + ja\frac{f}{f_R}}{1 - \left(\frac{f}{f_R}\right)^2 + jb\frac{f}{f_R}}$$

Phase equalization is not required.

FIG. 12 shows the transfer coefficient measured using $f_1 = 12.3$ MHz, $f_R = 20$ MHz, $V_o = 1$, $a = 1.17$, and $b = 0.16$.

FIG. 4b shows the diagram as measured after the converter. This signal is suitable as a control criterion.

The previously mentioned transfer coefficient function is composed of a low pass filter and a resonant amplifier with a series and parallel attenuation circuit.

FIG. 13, which has already been described, shows simple possibilities for implementing this function.

There has thus been shown and described a novel self-adjusting equalizer configuration which automatically adjusts to the cable length which fulfills all the object and advantages sought. Many changes, modifications, variations and other uses and application of the subject invention will, however, become apparent to those skilled in the art after considering this specification which discloses embodiments thereof. All such changes, modifications, variations and other uses and applications which do not depart from the spirit and scope of the invention are deemed to be covered by the invention which is limited only by the claims which follow.

What is claimed is:

1. A self-adjusting equalizer for automatically adjusting to a cable length comprising band limitation means for transmitting digital signals, the band limitation means including an equalizing amplifier, a correction filter and an amplitude control circuit for controlling the output of the equalizing amplifier characterized by the equalizing amplifier (1) having an output which is connected to an input of the correction filter (6) which is within an amplitude control-loop (2,2'), the input signal to the correction filter being the output signal of the equalizing amplifier, the output signal of the correction filter representing the control signal for controlling the amplitude control circuit and also for controlling a time recovery means (4) for a discriminator (3) having an input connected to the output of the equalizing amplifier.

2. The equalizer configuration according to claims 1, wherein the circuit configuration and size of said correction filter is selected so that it has the following transfer function $$V(f) = V_o \cdot \frac{1}{1 + j\frac{f}{f_1}} \cdot \frac{1 - \left(\frac{f}{f_R}\right)^2 + ja\frac{f}{f_R}}{1 - \left(\frac{f}{f_R}\right)^2 + jb\frac{f}{f_R}}$$

where $V_o$ is basic amplification, $f_1$ the cut-off frequency of a low pass filter, and $f_R$ the resonant frequency of a tuned circuit, with a and b as its constants.

* * * * *